UNITED STATES PATENT OFFICE.

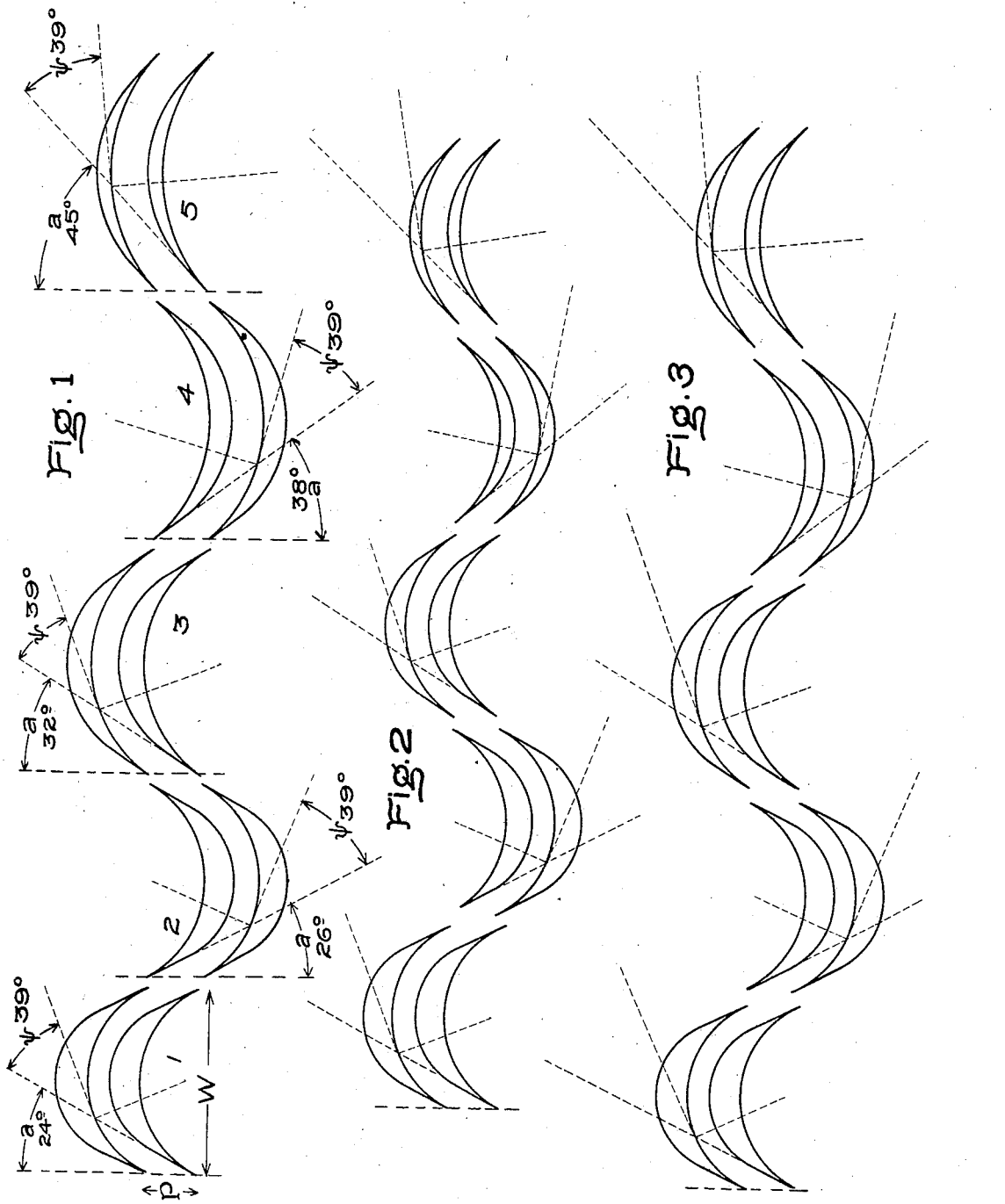
S. A. MOSS.
BUCKET FOR ELASTIC FLUID TURBINES.
APPLICATION FILED JULY 20, 1907.
910,408.
Patented Jan. 19, 1909.
Witnesses
Marcus L. Byng.
J. Ellis Glen.
Inventor,
Sanford A. Moss,
By Albert G. Davis
Atty.

SANFORD A. MOSS, OF LYNN, MASSACHUSETTS, ASSIGNOR TO GENERAL ELECTRIC COMPANY, A CORPORATION OF NEW YORK.

BUCKET FOR ELASTIC-FLUID TURBINES.

No. 910,408.

Specification of Letters Patent.

Patented Jan. 19, 1909.

Application filed July 20, 1907. Serial No. 384,780.

*To all whom it may concern:*

Be it known that I, SANFORD A. MOSS, a citizen of the United States, residing at Lynn, county of Essex, State of Massachusetts, have invented certain new and useful Improvements in Buckets for Elastic-Fluid Turbines, of which the following is a specification.

This invention relates to turbines actuated by elastic fluid, such as steam, and its object is to give such shapes to the buckets, both moving and stationary, that the shock angle will be kept at or near a constant value for the entire series.

In turbines which comprise a series of wheel buckets and intermediates, it is usual, for reasons which need not be here explained, to have the entrance angles of successive buckets increase from row to row. In many turbines the angles vary as follows: 24°, 26°, 32°, 38°, 45°. Now the shock angle varies directly with the entrance angle and with the ratio of pitch to width of bucket. The shock angle is that between the line of the entering stream of steam and a tangent to the curve of the bucket at the point where said stream impinges upon it. Owing to the width of the stream, the various portions of it cannot be all turned at the same point, and the shock angle gives a measure of the losses due to the bending of the entering stream and the resulting eddies therein. The smaller the shock angle is, the less will be the eddies introduced. It is therefore possible to lessen these eddy losses by modifying the pitch and width of each successive bucket so that although the entrance angles increase successively yet the shock angles shall remain constant or nearly so.

It has been found that the cosine of the shock angle can be expressed mathematically as $1 - \frac{P}{W} \sin 2a$, where P is the pitch, W the width and $a$ the entrance angle of the bucket. If, therefore, it is desired to keep the shock angle constant, in a series where the entrance angle increases, it can be done by choosing for each bucket a pitch and a width which will give a constant value to the above expression.

It is not necessary that the shock angle be mathematically the same for each row of buckets, but only that care be taken to prevent it from becoming injuriously large. The principle to be kept in mind is that in a series of wheel and intermediate buckets in which the entrance angle successively increases, the ratio of pitch to width must successively decrease. This may be effected by increasing the width and keeping the pitch constant, or by keeping the width constant and decreasing the pitch, or by varying both the width and pitch irregularly in such a way that their ratio decreases.

In the accompanying drawing, Figure 1 is a diagram illustrating the first of the above-mentioned modes of keeping the shock angle constant. Fig. 2 illustrates the second mode, and Fig. 3 illustrates the third mode.

Referring first to Fig. 1, the entrance angles $a$ of the alternate buckets and intermediates 1, 2, 3, 4, 5 are respectively 24°, 26°, 32°, 38° and 45°. The shock angle $\psi$ for each bucket and intermediate is 39°. In this case, the pitch is assumed to be constant at say .30 inches, and the widths of the buckets and intermediates vary approximately as follows: bucket 1, 1 inch; intermediate 2, 1.071; bucket 3, 1.225; intermediate 4, 1.304; bucket 5, 1.333.

In Fig. 2, the entrance angles and the shock angle are the same as in Fig. 1, and the width is assumed to be constant at say one inch. In this case, the requirements of the formula give the successive pitches approximately as follows: 0.30, 0.28, 0.245, 0.23, 0.225.

In Fig. 3, we have still the same entrance and shock angles as in the two preceding figures, but the width and the pitch are both varied for each bucket and intermediate, in such manner as still to maintain a constant value for the shock angle in the formula, $\cos \psi = 1 - \frac{P}{W} \sin 2a$. The successive ratios given to P and W in Fig. 3 are approximately as follows:

$$\frac{0.30 \quad 0.288, \quad 0.270, \quad 0.265, \quad 0.270}{1.00, \quad 1.03 \quad 1.10 \quad 1.15 \quad 1.20.}$$

It is evident that the principle above set forth applies equally well to cases where the entrance angles successively decrease instead of increasing; the ratio of pitch to width in such case being arranged to increase similarly.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A series of turbine buckets, having successively changing entrance angles, and in which the ratio of pitch to width changes inversely to said angles.

2. A series of turbine buckets, having successively changing entrance angles $a$, and in which the shock angle $\psi$ for each bucket has a value determined by the expression $\cos. \psi = 1 - \frac{P}{W} \sin. 2a$ in which expression P designates the pitch of the buckets, W represents the width of said buckets, and the quantity $1 - \frac{P}{W} \sin. 2a$ has an assigned value which is obtained by varying the ratio between P and W.

3. A series of turbine buckets, having successively increasing entrance angles, and in which the ratio of pitch to width successively decreases.

4. A series of turbine buckets, having successively increasing entrance angles, and in which the shock angle is kept substantially constant.

5. A series of turbine buckets, having successively increasing entrance angles $a$, and in which the shock angle $\psi$ has a constant value which is determined by the formula $\cos. \psi = 1 - \frac{P}{W} \sin. 2a$ in which P represents the pitch of the buckets, W represents the width of said buckets and the expression $1 - \frac{P}{W} \sin. 2a$ has a constant value which is obtained by varying the ratio between P and W.

6. A series of turbine buckets having successively increasing entrance angles, and in which the shock angle is kept substantially constant by varying the ratio between the pitch and the width of the buckets.

In witness whereof, I have hereunto set my hand this eighteenth day of July, 1907.

SANFORD A. MOSS

Witnesses:
JOHN A. McMANUS, Jr.,
ALVARADO LA ROY ELLIS